United States Patent
Wakisaka et al.

[11] Patent Number: 6,112,174
[45] Date of Patent: Aug. 29, 2000

[54] RECOGNITION DICTIONARY SYSTEM STRUCTURE AND CHANGEOVER METHOD OF SPEECH RECOGNITION SYSTEM FOR CAR NAVIGATION

[75] Inventors: Shinji Wakisaka, Ebina; Kazuyoshi Ishiwatari, Higashimurayama; Kouji Ito, Tokorozawa; Tetsuji Toge, Kodaira; Makoto Tanaka, Tokorozawa, all of Japan

[73] Assignees: Hitachi, Ltd.; Hitachi Microcomputer System Ltd., both of Tokyo, Japan

[21] Appl. No.: 08/970,109

[22] Filed: Nov. 13, 1997

[30] Foreign Application Priority Data

Nov. 13, 1996 [JP] Japan .................. 8-301802

[51] Int. Cl.[7] .............. G10L 15/04; G10L 21/00
[52] U.S. Cl. ............. 704/251; 704/270; 704/231; 704/257; 704/275; 364/449; 364/436
[58] Field of Search ................... 704/251, 254, 704/231, 244, 252, 243, 246, 226, 233, 255, 270, 275, 257; 364/436, 449

[56] References Cited

U.S. PATENT DOCUMENTS

| | | |
|---|---|---|
| 4,717,261 | 1/1988 | Kita et al. ................... 368/63 |
| 4,827,520 | 5/1989 | Zeinstra ................... 704/270 |
| 4,979,213 | 12/1990 | Nitta ....................... 704/245 |
| 5,027,406 | 6/1991 | Roberts et al. ............. 704/244 |
| 5,041,983 | 8/1991 | Naakahara et al. .......... 364/449 |
| 5,181,250 | 1/1993 | Morgan et al. ............. 381/51 |
| 5,182,765 | 1/1993 | Ishii et al. ................. 379/88 |
| 5,274,560 | 12/1993 | LaRue ..................... 364/444 |
| 5,406,492 | 4/1995 | Suzuki .................... 364/449 |
| 5,452,212 | 9/1995 | Yokoyama et al. .......... 364/449 |
| 5,454,062 | 9/1995 | LaRue ..................... 704/254 |
| 5,454,063 | 9/1995 | Rossides ................... 704/275 |
| 5,497,446 | 3/1996 | Aso ........................ 704/201 |
| 5,644,680 | 7/1997 | Bielby et al. .............. 704/240 |
| 5,699,056 | 12/1997 | Yoshida ................... 340/905 |
| 5,704,005 | 12/1997 | Iwamida ................... 704/254 |
| 5,717,738 | 2/1998 | Gammel ................... 379/67 |
| 5,719,771 | 2/1998 | Buck et al. ................ 364/443 |
| 5,774,851 | 6/1998 | Miyashiba et al. .......... 704/252 |
| 5,778,340 | 7/1998 | Hattori .................... 704/244 |
| 5,845,250 | 12/1998 | Vogten .................... 704/270 |
| 5,859,628 | 1/1999 | Ross et al. ................. 345/173 |

*Primary Examiner*—David R. Hudspeth
*Assistant Examiner*—Vijay Chawan
*Attorney, Agent, or Firm*—Anotnelli, Terry, Stout & Kraus, LLP

[57] ABSTRACT

A speech recognition system realizing large-vocabulary speech recognition at a low cost without deteriorating the rate of recognition and a recognition speed performance is provided with a dictionary change-over section for making a change-over between dictionaries to be subjected to speech recognition in accordance with dictionary change-over information, a first memory for storing a plurality of dictionaries, a second memory for storing one dictionary made an object of recognition, and a speech recognition section for performing a speech recognition processing, whereby speech recognition is performed while making a change-over between dictionaries, as required. For example, in a car navigation speech recognition system, the change-over between dictionaries is made for each area in accordance with position information.

26 Claims, 7 Drawing Sheets

FIG. 8
PRIOR ART ered. A first storage section for storing a plurality of dictionaries including a dictionary as which any number or designated number of words or sentences made an object of

RECOGNITION DICTIONARY SYSTEM STRUCTURE AND CHANGEOVER METHOD OF SPEECH RECOGNITION SYSTEM FOR CAR NAVIGATION

BACKGROUND OF THE INVENTION

The present invention relates to a speech recognition system which is suitable for the use in a car navigation system, a small-size information equipment represented by PDA (Personal Digital Assistant), a portable speech translator or the like, and more particularly to a speech recognition guidance system which is suitable for the use in the car navigation system for the speech recognition of enormous words including the names of places, intersections, roads, and so forth.

In recent years, small-size information systems using speech recognition techniques are being popularized. Such a system includes a portable information equipment represented by PDA, a portable translator and so forth, inclusive of a car navigation system. In the small-size information system of the prior art, however, the number of words to be recognized is restricted in order that the rate of recognition and a recognition response time performance are not deteriorated.

Also, JP-A-5-35776 entitled "TRANSLATION APPARATUS WITH AUTOMATIC LANGUAGE SELECTING FUNCTION" has disclosed a portable translation apparatus which recognizes an operator's speech inputted from a microphone for translation it and outputs a speech in a translated language.

Figure 8:
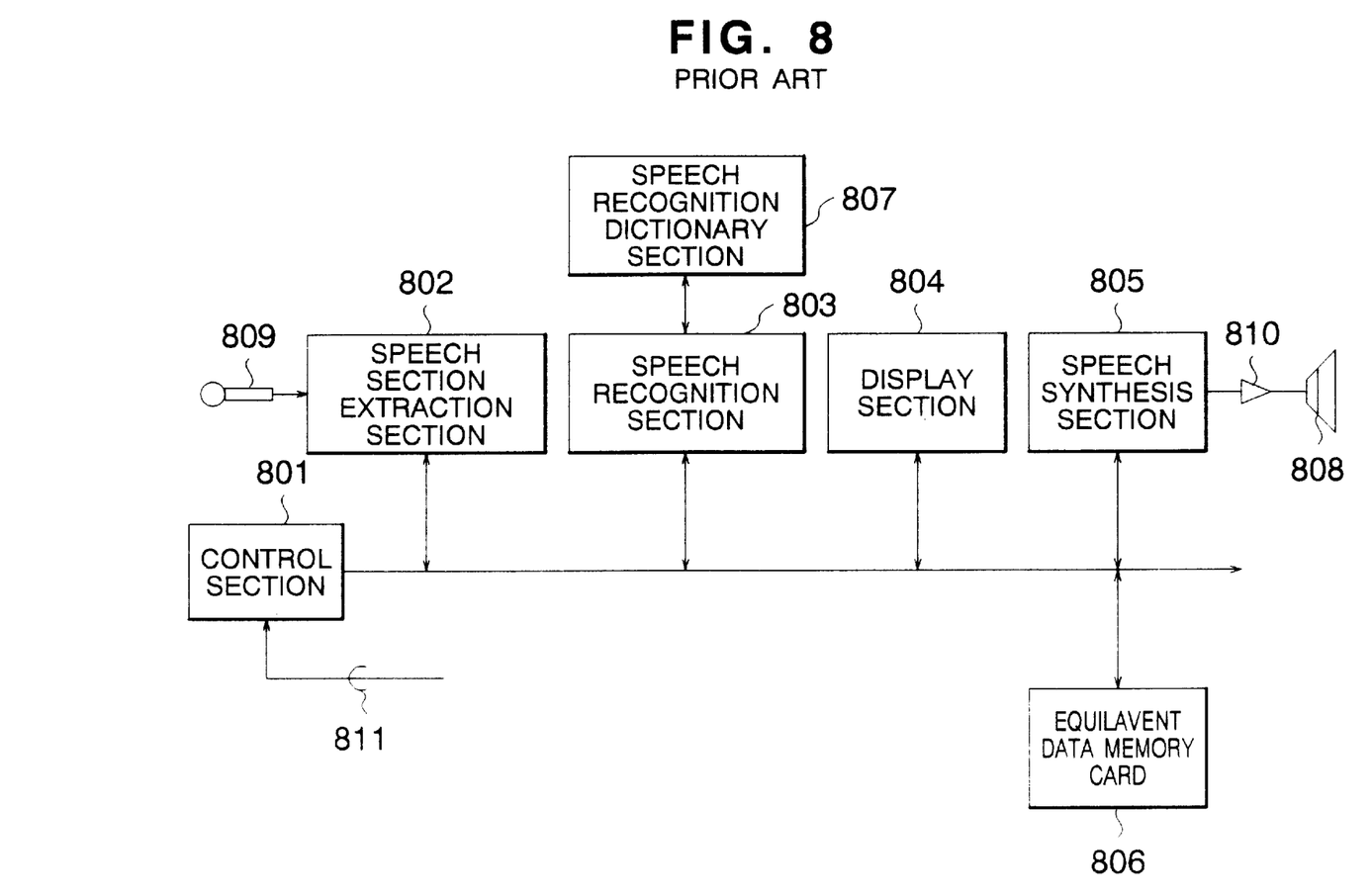
FIG. 8 is a block diagram showing the construction of the conventional portable speech translator using speech recognition.

FIG. 8 is a block diagram showing an example of such a conventional speech translation apparatus. In FIG. 8, reference numeral 801 denotes a control section, numeral 802 a speech section extraction section, numeral 803 a speech recognition section, numeral 804 a display section, numeral 805 a speech synthesis section, numeral 806 an equivalent data memory card, numeral 807 a speech recognition dictionary section, numeral 808 a speaker, numeral 809 a microphone, numeral 810 a speaker amplifier, and numeral 811 an operating signal.

The control section 801 includes a micro-computer or the like and controls each section of the apparatus. The speech section extraction section 802 extracts a speech input from the microphone 809. The extraction is made in a form converted into a digital signal. The extracted speech is sent to the speech recognition section 803. In accordance with an instruction from the control section 801 receiving the operating signal 811 derived from a keyboard, switch or the like, the speech recognition section 803 analyzes the speech input from the microphone 809 and extracted through the speech section extraction section 802. The speech recognition section 803 performs speech recognition by comparing the result of analysis with standard speech patterns stored in the speech recognition dictionary section 807.

The speech synthesis section 805 reads data information equivalent to the recognized speech from the equivalent data memory card 806 and converts the information equivalent into an aural signal which is in turn output as a speech through the speaker amplifier 810 and the speaker 808.

The display section 804 provides an indication to a user of the translation apparatus or a visual display of the equivalent by characters. The equivalent data memory card 806 includes a read-only-memory ROM or the like. In the case where the data information equivalent is output in a speech synthesized form, speech data is stored in the equivalent data memory card 806. Also, a character code corresponding to the data information equivalent is read from the equivalent data memory card 806 so that it is displayed on the display section 804. The exchange of the equivalent data memory card 806 for a memory card of another language makes the translation into a plurality of languages possible. The speech recognition dictionary section 807 includes a data-access-memory RAM or the like. Standard speech patterns corresponding to the speech of the operator are stored in the speech recognition dictionary section 807. The standard speech patterns are stored by the operator beforehand.

SUMMARY OF THE INVENTION

An object of the present invention is to provide a system which can recognize a speech with no deterioration of the rate of recognition and a recognition response time performance even if the number or vocabulary of words to be speech-recognized is increased.

Another object of the present invention is to provide a satisfactory speech recognition interface in a car navigation system using speech recognition.

To attain the above object, a speech recognition system according to one aspect of the present invention comprises a first storage section for storing a plurality of dictionaries including a dictionary as to which any number or designated number of words or sentences to be made an object of speech recognition are prepared and defined and another dictionary as to which any number or designated number of other words or sentences to be made of an object of speech recognition are prepared and defined, a second storage section for storing only one selected from among the plurality of dictionaries, a dictionary change-over section for making a change-over between the plurality of dictionaries in response to the reception of dictionary change-over information which selects only one from among the plurality of dictionaries, a speech analysis section for performing a speech analysis processing for an input speech, and a speech recognition section for performing a speech recognition processing for the result of speech analysis by the speech analysis section from the dictionary selected by the dictionary change-over section and stored in the second storage section and an acoustic model, whereby speech recognition is made limiting words or sentences made an object of speech recognition.

The first storage section for storing the plurality of dictionaries may include a memory card or ROM and the second storage section for storing only one selected from among the plurality of dictionaries may include a RAM.

The dictionary change-over information selecting only one from among the plurality of dictionaries may include position information from a global positioning system used in a car navigation system.

The speech recognition system may be used in a car navigation system and may be constructed such that when any number or designated number of words or sentences made an object of speech recognition are prepared and defined as a dictionary. The dictionary is formed by the names of places, roads, structures, gasoline service stations, convenience stores, family restaurants and so forth which exist in any or designated area. Such dictionary is prepared for each area.

To attain the above object, a speech recognition system according to another aspect of the present invention comprises a first storage section for storing a plurality of dictionaries including a dictionary as which any number or designated number of words or sentences made an object of speech recognition are prepared and defined and another dictionary as which any number or designated number of other words or sentences made of an object of speech recognition are prepared and defined, a second storage section for storing only one selected from among the plurality of dictionaries, a dictionary change-over section for making a change-over between the plurality of dictionaries in response to the reception of the result of recognition or dictionary change-over information which selects only one from among the plurality of dictionaries, a speech analysis section for performing a speech analysis processing for an input speech, and a speech recognition section for performing a speech recognition processing for the result of speech analysis from the dictionary selected by the dictionary change-over section and stored in the second storage section and an acoustic model, whereby speech recognition is made limiting words or sentences made an object of speech recognition.

The speech recognition system may be used in a car navigation system and may be constructed such that when any number or designated number of words or sentences made an object of speech recognition are prepared and defined as a dictionary. The dictionary is formed by the names of places, roads, structures, gasoline service stations, convenience stores, family restaurants and so forth which exist in any or designated area. Such dictionary is prepared for each area to perform speech recognition, and in the case where the result of speech recognition a corresponding word does not exist in a dictionary, the speech recognition is performed with a change made to the next dictionary which is made the object of speech recognition.

The speech recognition system may be used in a car navigation system and may be constructed such that when any number or designated number of words or sentences made an object of speech recognition are prepared and they are defined as a dictionary. The dictionary is formed by the names of places, roads, structures, gasoline service stations, convenience stores, family restaurants and so forth which exist in any or designated area. Such dictionary is prepared for each area to perform speech recognition, and in the case where the result of speech recognition indicates an index of a dictionary, the speech recognition is performed with a change made to a dictionary as an object of speech recognition which is indicated by the index.

According to the present invention as mentioned above, a convenient interface using speech recognition can be realized in a car navigation system, a portable information equipment such as PDA, a portable translator, and so forth. More particularly, there can be realized a high-performance speech recognition system in which the rate of recognition or a recognition speed is not deteriorated even if the number of words to be recognized is increased.

DESCRIPTION OF THE PREFERRED EMBODIMENTS

Embodiments of the present invention will now be described using the drawings.

Figure 1:
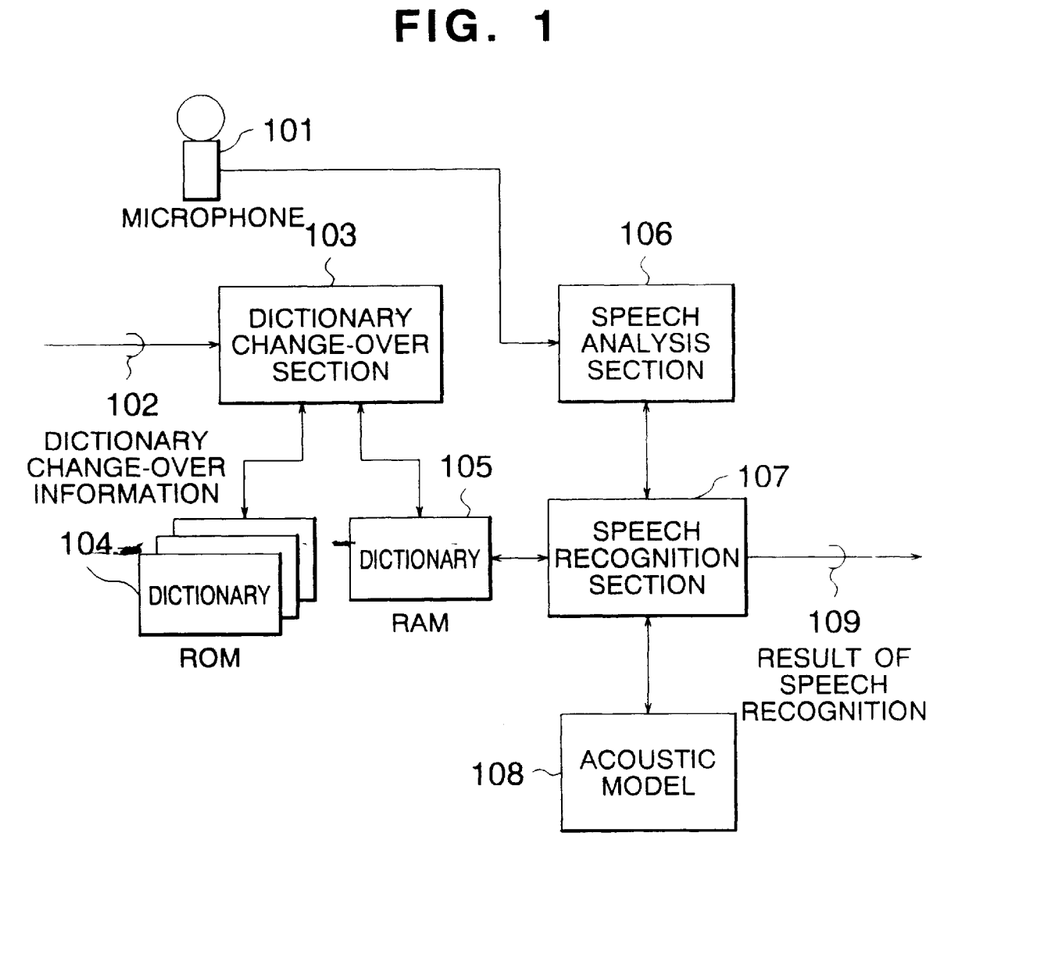
FIG. 1 is a block diagram showing the processing function of a speech recognition system according to a first embodiment of the present invention.

FIG. 1 is a block diagram showing the processing function of a speech recognition system according to a first embodiment of the present invention.

In FIG. 1, reference numeral 101 denotes a microphone for inputting a speech.

Numeral 102 denotes dictionary change-over information. A term "dictionary" used in conjunction with the present invention means an assembly of expressions or words (noun, verb and so forth) made an object of speech recognition. For example, in a car navigation system, the dictionary is the assembly of words which include the names of roads, places, structures and streets, street numbers, and the names of intersections, gasoline service stations, convenience stores, family restaurants and so forth and words which are required for necessary and minimum conversations. One dictionary is composed of, for example, 1000 to 5000 words. A plurality of such dictionaries are prepared and one dictionary made an object of speech recognition is selected from among the plurality of dictionaries to perform speech recognition.

Numeral 103 denotes a dictionary change-over section which performs the selection of one dictionary from among a plurality of dictionaries or a change-over between the dictionaries to be subjected to speech recognition in accordance with the contents of the dictionary change-over information 102. For example, a plurality of dictionaries are stored in a memory card or ROM (Read Only Memory) and only a dictionary required at the time of speech recognition is transferred to a RAM (Random Access Memory) to perform a speech recognition processing.

Numeral 104 denotes a storage device or storage area which stores the plurality of dictionaries and includes a memory card or ROM.

Numeral 105 denotes a storage device or storage area which stores one selected from among the plurality of dictionaries as an object of speech recognition and includes a RAM.

Numeral 106 denotes a speech analysis section which performs a noise processing and a speech analysis processing for a speech inputted from the microphone 101.

Numeral 107 denotes a speech recognition section which makes the successive collation of the inputted speech on the basis of the result of speech analysis of the inputted speech determined by the speech analysis section 106 and by use of the dictionary 105 and an acoustic model 108 to determine the nearest word in the dictionary 105.

Numeral 108 denotes an acoustic model corresponding to speech recognition for an unspecified speaker, for example, HMM (Hidden Markov Model).

Numeral 109 denotes the result of speech recognition determined by the speech recognition section 107.

Each processing block shown in FIG. 1 may be a system formed by a plurality of LSI's or memories or one or more system-on-chips formed on a semiconductor device.

Figure 2:
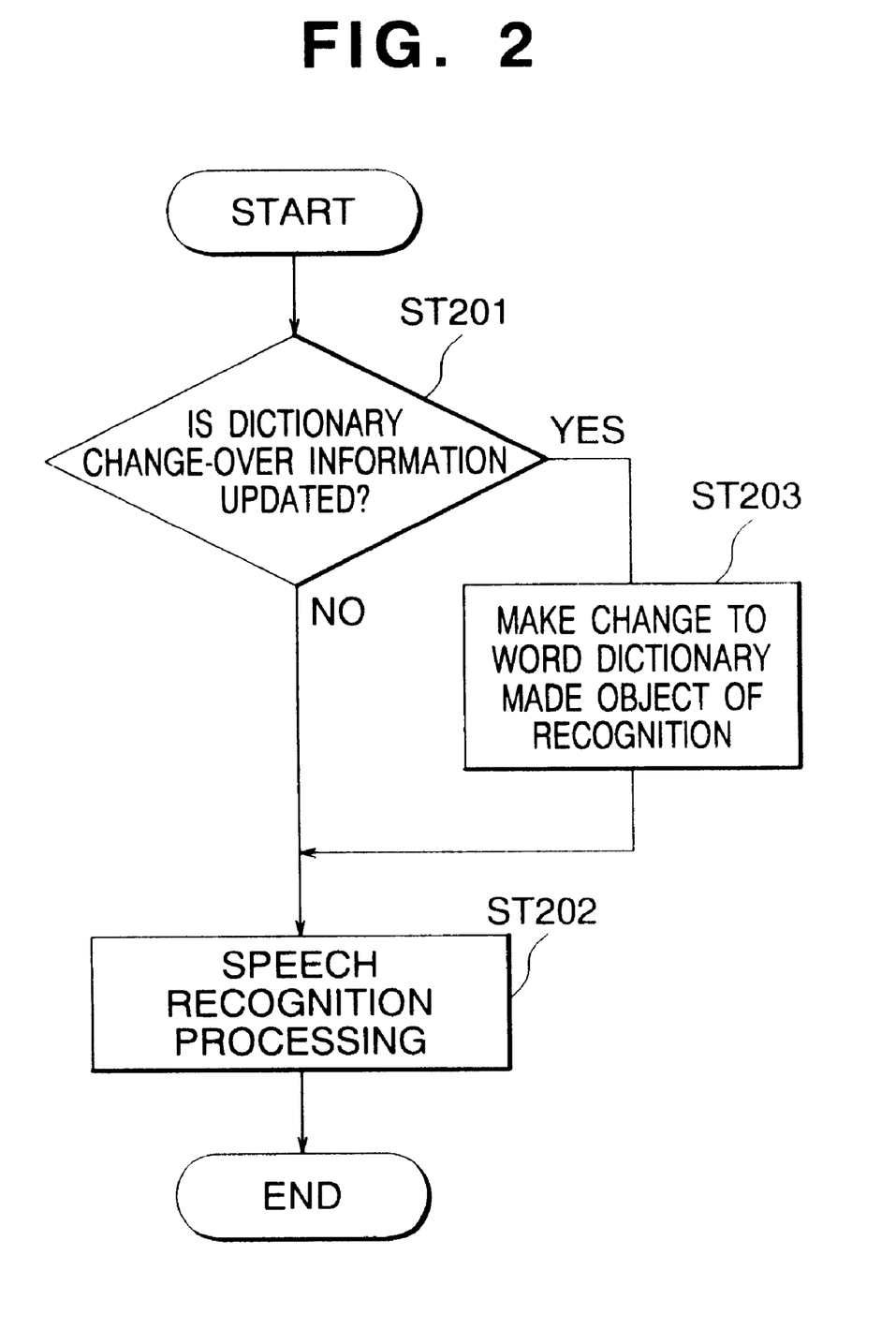
FIG. 2 is a flow chart showing a dictionary change-over and speech recognition processing in the first embodiment of the present invention.

FIG. 2 is a flow chart showing a dictionary change-over and speech recognition processing in the present embodiment.

In step ST201, a judgement processing is performed for making the inquiry about whether or not dictionary change-over information 102 is updated. For example, in the case of a car navigation system, the dictionary change-over information 102 is a signal from a GPS (Global Positioning System) indicative of a position.

The dictionary change-over section 103 receiving the signal from the GPS indicative of a position makes a change to a word dictionary made of an object of recognition (step ST203) in the case where the position indicates that a change-over between word dictionaries to be subjected to recognition is necessary (or in the case where the result of judgement in step ST201 is affirmative). In the case where the position indicates that the change-over between word dictionaries to be subjected to recognition is not necessary (or in the case where the result of judgement in step ST201 is negative), a speech recognition processing is immediately performed in step ST202 without making the change-over between dictionaries.

A dictionary change-over condition is, for example, as follows. Namely, when a car is running toward a Y point from an X point and in the case where the present position of the car is in a predetermined area $E_X$ including the X point, a dictionary $D_X$ to be used for speech recognition in the area $E_X$ is used. In the case where the present position of the car falls in a predetermined area $E_Y$ including the Y point, a dictionary $D_Y$ to be used in the area $E_Y$ is used.

Figure 3A:
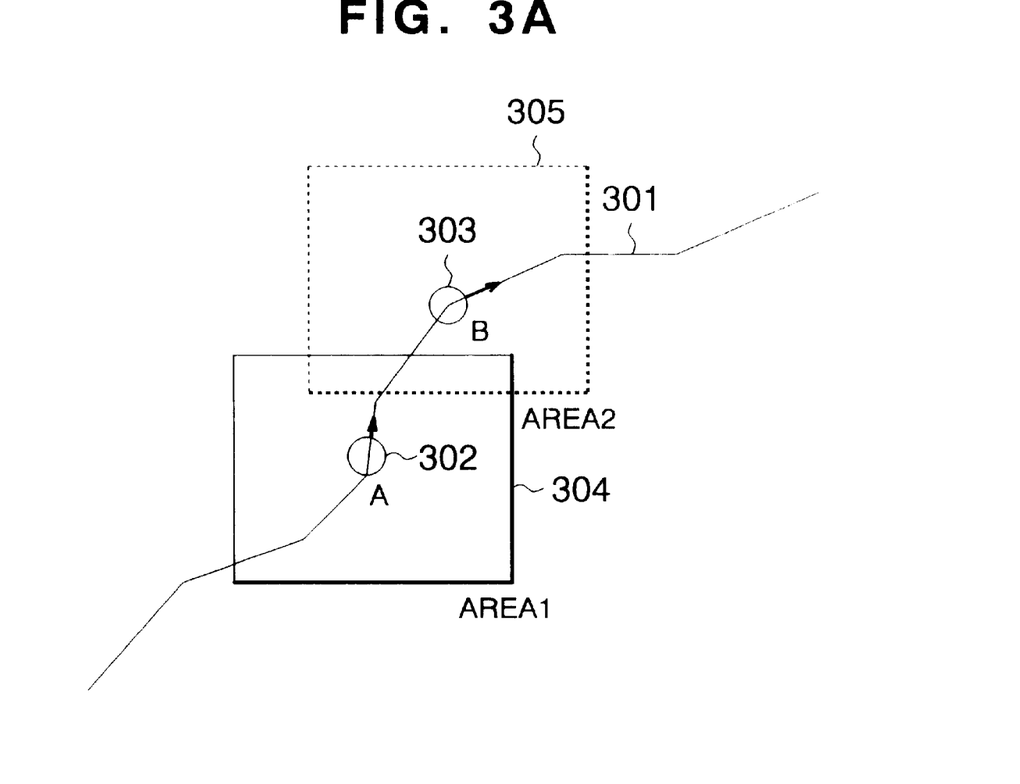
FIGS. 3A and 3B are diagram for explaining a change-over between dictionaries in a car navigation system according to the first embodiment of the present invention.
Figure 3B:
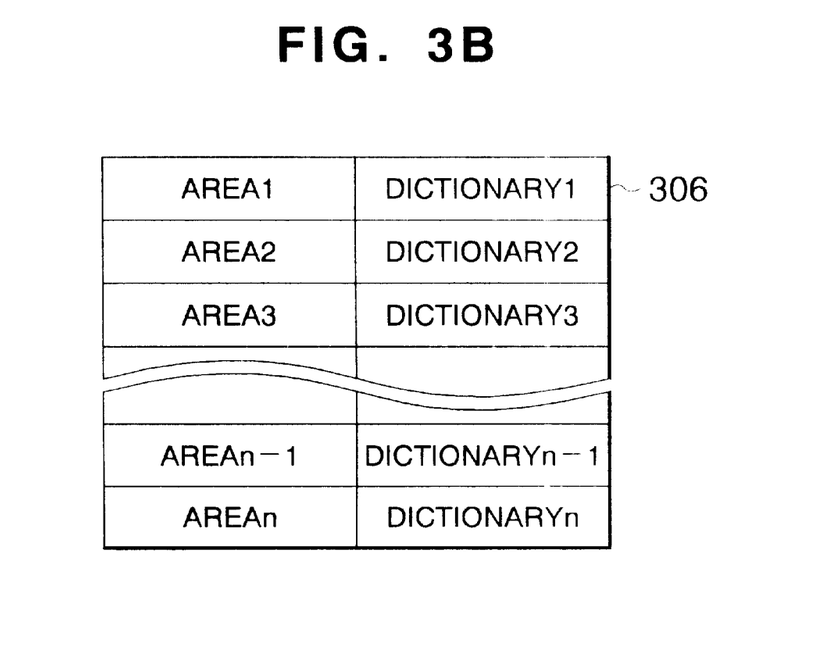

FIGS. 3A and 3B are diagrams for explaining a change-over between dictionaries in the case of car navigation.

In FIG. 3A, reference numeral 301 denotes a road on which a car having a car navigation system mounted thereon is actually running. Numeral 302 denotes a point (or A point) at which and a running direction in which the car having the car navigation system mounted thereon is running at the present time.

At the A point, speech-recognizable words include the names of places, roads, structures, gasoline service stations, convenience stores, restaurants and so forth which exist in an area 1 indicated by numeral 304. The number of the names of places, roads, structures, gasoline service stations, convenience stores, restaurants and so forth existing in an area differs in accordance with a reduced scale which is represented. Also, the number of the names of places, roads, structures, gasoline service stations, convenience stores, restaurants and so forth existing in a represented area differs between the case where the represented area is a town area and the case where the represented area is a depopulated area such as a country area or mountainous area.

In the case where k of a scale of 1/k is large, a wide area is represented and hence the number of words is increased. For example, provided that the maximum number of words causing no deterioration of the rate of recognition and a recognition response time performance in speech recognition is 3000, an area is divided in units of 3000 words. However, in the case of a wide area, a dictionary is formed by words which include the names of large roads, large intersections and famous structures.

On the other hand, in the case where k of the scale of 1/k is small, a narrow area is represented and hence the number of words is decreased. However, if the names of small roads, small intersections and local structures are included, the number of words increases. Accordingly, in case where k of the scale of 1/k is small, too, the number of words in a dictionary is restricted to 3000 at the maximum since a driver wants to know the names of smaller roads, smaller intersections and smaller structures.

Now assume, for example, the case where in the represented area 1 a driver gives utterance of "ABC" (indicative of the name of a certain specified gasoline supply marker) for a car navigation system. If a gasoline service station of the ABC group in the area 1 is 5 km ahead from here, a response of "5 KM AHEAD FROM HERE" is provided by speech synthesis.

Next, assume the case where the car passed through the A point is running a B point at the present time. In this case, numeral 303 in FIG. 3A denotes a point (or B point) at which and a running direction in which the car having the car navigation system mounted thereon is running at the present time. At the B point, speech-recognizable words include the names of places, roads, structures, gasoline service stations, convenience stores, restaurants and so forth which exist in an area 2 indicated by numeral 305.

FIG. 3B shows a table 306 which represents a relationship between areas and dictionaries as mentioned above. The table 306 is possessed by the car navigation system.

A dictionary 1 is composed of words including the names of places, intersections, structures, gasoline service stations, convenience stores, restaurants and so forth which exist in an area 1. Also, a dictionary 2 is composed of words including the names of places, intersections, structures, gasoline service stations, convenience stores, restaurants and so forth which exist in an area 2. Similarly, a dictionary n is composed of words including the names of places, intersections, structures, gasoline service stations, convenience stores, restaurants and so forth which exist in an area n.

Figure 4:
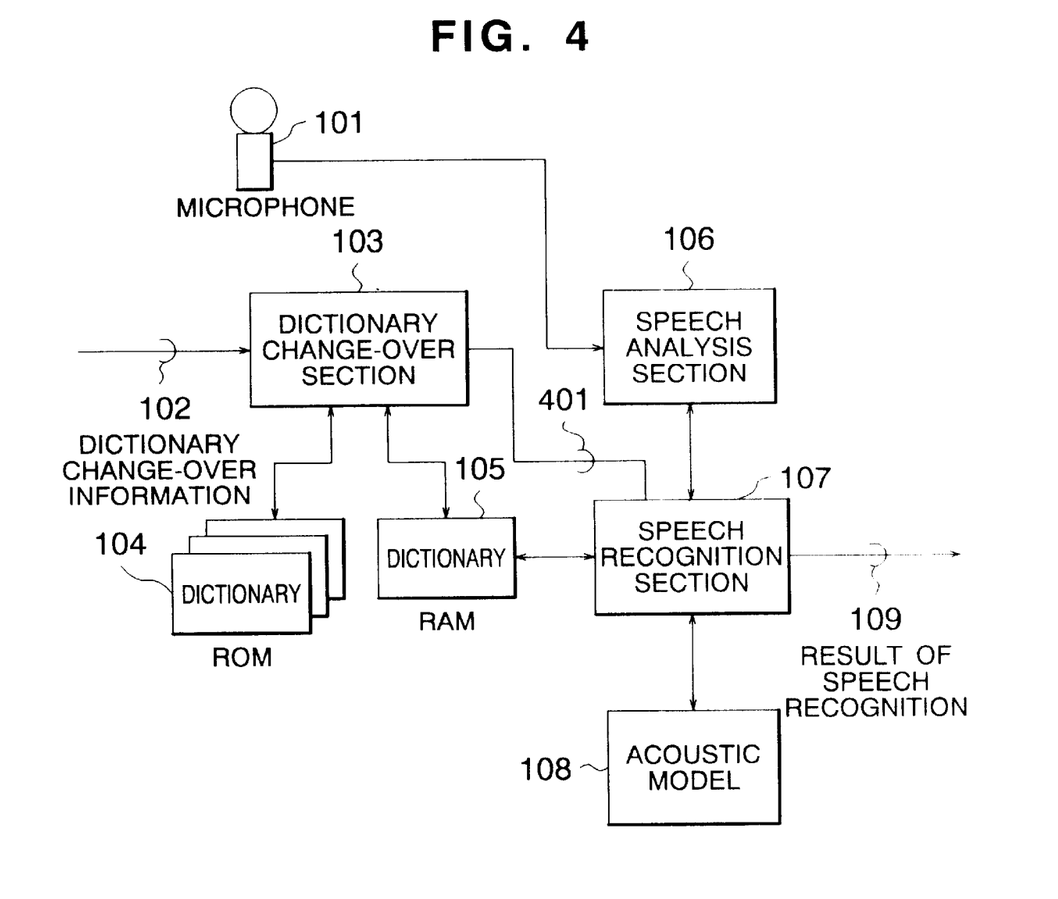
FIG. 4 is a block diagram showing the processing function of a speech recognition system according to a second embodiment of the present invention.

FIG. 4 is a block diagram showing a processing function of a speech recognition system according to a second embodiment of the present invention. Components in FIG. 4 equivalent to those in FIG. 1 are denoted with the same reference numerals as those used in FIG. 1 and the explanation thereof will be omitted in order to avoid a repeated explanation. In FIG. 4, reference numeral 401 denotes information or a signal indicative of the result of recognition for feeding the result of speech recognition 109 from the speech recognition section 107 back to the dictionary change-over section 103.

In the present embodiment too, each processing block shown in FIG. 4 may be a system formed by a plurality of LSI's or memories or one or more system-on-chips formed on a semiconductor device.

Figure 5:
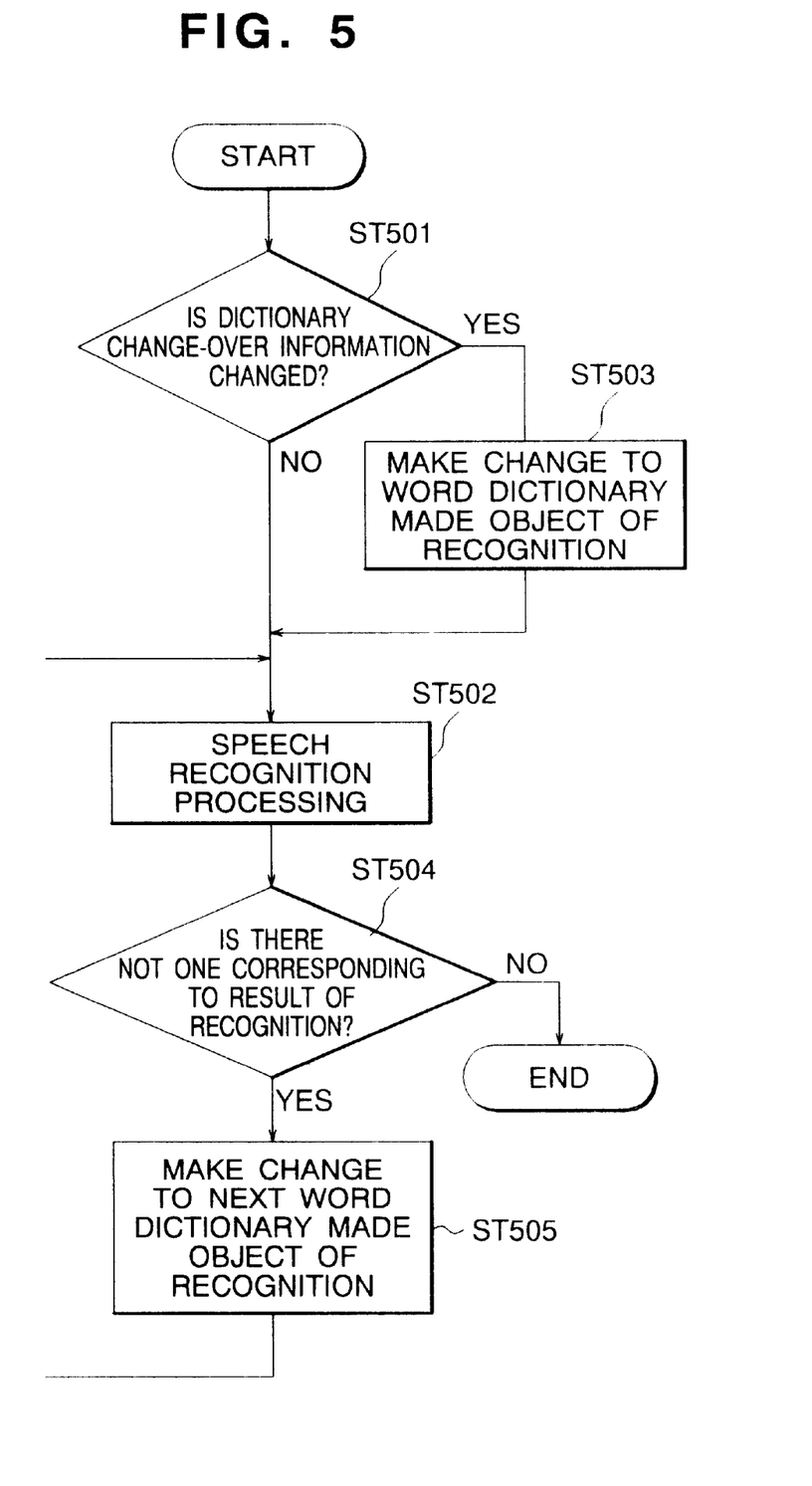
FIG. 5 is a flow chart showing a dictionary change-over and speech recognition processing in the second embodiment of the present invention.

FIG. 5 is a flow chart showing a dictionary change-over and speech recognition processing in accordance with the present embodiment.

In step ST501, a judgement processing is performed for making the inquiry about whether or not dictionary change-over information 102 is updated. For example, in the case of a car navigation system, the dictionary change-over information 102 is a signal from a GPS (Global Positioning System) indicative of a position, as mentioned earlier.

The dictionary change-over section 103 receiving the signal from the GPS indicative of a position makes a change to a word dictionary made of an object of recognition (step ST503) in the case where the position indicates that a change-over between word dictionaries to be subjected to recognition is necessary (or in the case where the result of judgement in step ST501 is affirmative). In the case where the position indicates that the change-over between word dictionaries to be subjected to recognition is not necessary (or in the case where the result of judgement in step ST501 is negative), a speech recognition processing is immediately performed in step ST502 without making the change-over between dictionaries.

In step ST504 subsequent to step ST502, a judgement processing is performed for making the inquiry about whether or not there is a corresponding word in a dictionary to the result of recognition.

In the case where there is no corresponding word in a dictionary for an inputted speech (or in the case where the result of judgement in step ST504 is affirmative), the dictionary change-over section 103 receives the result of recognition 401 indicating the absence of the corresponding word and makes a change to a word dictionary of the next candidate made of an object of recognition (step 505). On the other hand, in the case where there is the corresponding word in a dictionary for an inputted speech (or in the case where the result of judgement in step ST504 is negative), the speech recognition processing is completed and the flow proceeds to the next processing for the result of recognition in the system.

Figure 6:
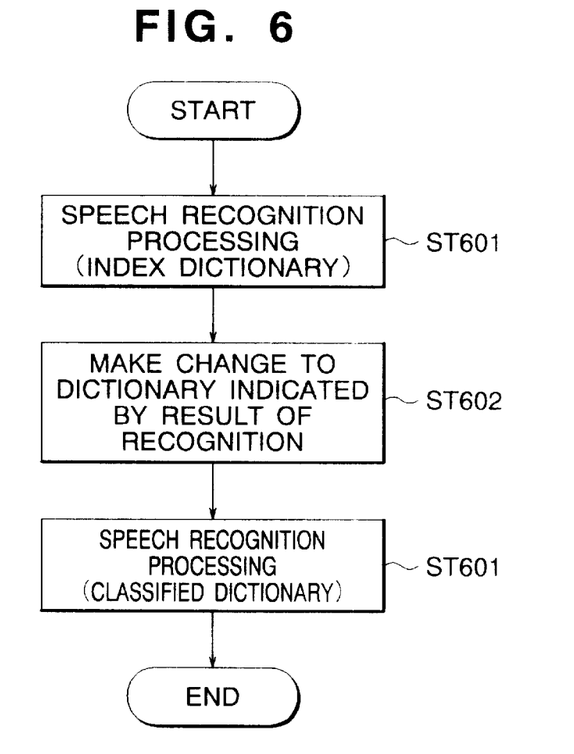
FIG. 6 is a flow chart showing a dictionary change-over and speech recognition processing in the third embodiment of the present invention.

FIG. 6 is a flow chart showing a dictionary change-over and speech recognition processing in a third embodiment of the present invention in the case where a speech recognition system of the present invention is mounted on a system which is not limited to (or is inclusive of) the above-mentioned speech recognition system for use in a car navigation system and includes a portable information equipment represented by PDA (Personal Digital Assistants), a portable translator and so forth.

Step ST601 is a speech recognition processing in which speech recognition is performed for dictionaries as which commands, indexes or the like are registered.

In step ST602, a change to a dictionary indicated by the result of recognition of, for example, an "address book" is made for the result of recognition of the command, index or the like. Dictionaries classified into commands, indexes or the like are prepared. An address book dictionary is composed of person's names which are registered.

When a speech input of, for example, "FUJIYAMA TARO" is made in step ST603, "FUJIYAMA TARO" is subjected to a speech recognition processing so that the address of FUJIYAMA TARO is output.

Figure 7:
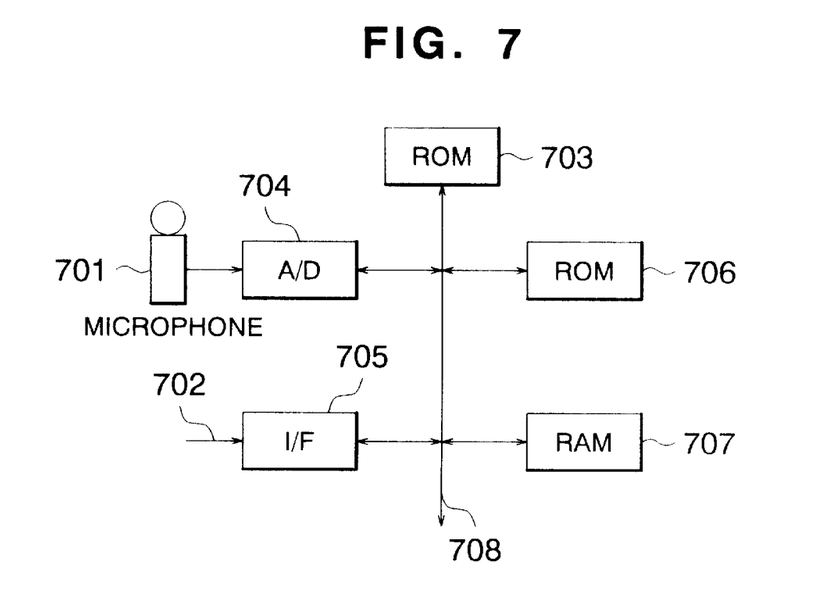
FIG. 7 is a block diagram showing an example of a hardware construction for structuring a speech recognition system according to the present invention.

FIG. 7 is a diagram showing an example of a hardware construction for structuring a speech recognition system according to the present invention.

In FIG. 7, reference numeral 701 denotes a microphone for inputting a speech. In a car navigation system or the like, the microphone 701 is a directional microphone having a directivity so that ambient noises are filtered.

Numeral 702 denotes data or a control signal for making a change-over between dictionaries. In the case of a car navigation system, input data 702 is position data sent from a Global Positioning system GPS.

Numeral 703 denotes a CPU or RISC microcomputer which performs the control of a main system such as a car navigation system, PDA or the like and a speech recognition processing in a speech recognition system.

Numeral 704 denotes an A/D converter IC for converting analog speech data inputted from the microphone 701 into digital speech data.

Numeral 705 denotes an interface for receiving the dictionary change-over data 702 so that the dictionary change-over data is read into the CPU 703.

Numeral 706 denotes a read-only-access-memory ROM or memory card which stores dictionaries, acoustic models and programs.

Numeral 707 denotes a random-access-memory RAM having an access time which is short as compared with that of the ROM 706. A part of dictionaries, acoustic models and programs transferred from the ROM 706 are stored in the RAM 707. The RAM 707 is a necessary and minimum work memory which is necessary for the speech recognition processing.

Numeral 708 denotes a bus in the system including a data bus, an address bus, a control signal bus, and so forth.

A speech input from the microphone 701 is speech-recognized for a dictionary changed in accordance with dictionary change-over data 702. The dictionary change-over is performed by the CPU 703 so that a part of dictionaries from among the whole dictionaries in the ROM 706 are transferred to the RAM 707, as required. A series of speech recognition processings are performed through a data processing between the CPU 703 and the RAM 707.

What is claimed is:

1. A speech recognition system for a vehicle, comprising:
   a first storage section for storing a plurality of dictionaries each of which including a dictionary in which any number or designated number of words or sentences to be made an object of speech recognition are prepared and defined corresponding to a specific one of a plurality of areas on a map;
   a second storage section for storing a dictionary selected from said plurality of dictionaries;
   a dictionary change-over section for making a change-over between said plurality of dictionaries to select a dictionary from said plurality of dictionaries, in response to input of dictionary change-over information based on position information generated from a Global Positioning System for vehicle navigation;
   a speech analysis section for performing a speech analysis processing for an input speech;
   a speech recognition section for performing a speech recognition processing for the result of speech analysis by said speech analysis section from the dictionary selected by said dictionary change-over section and stored in said second storage section and an acoustic model; and
   a display section for providing a visual display of said dictionary change-over information to inform a user of the location of said vehicle relative to a particular area on the map and the number of words used for said speech recognition is limited to a predetermined number in accordance with a scale of the map displayed on said display section.

2. A speech recognition system according to claim 1, wherein said first storage section includes a memory card and/or a read-only-memory (ROM), and said second storage section includes a random-access-memory (RAM).

3. A speech recognition system according to claim 1, wherein said dictionary change-over information contains position information from said Global Position System for use in a vehicle navigation system for vehicle navigation.

4. A speech recognition system according to claim 1, wherein said dictionary is structured by picking up according to priority among words existed in a corresponding area of said plurality of areas in accordance with scale of the area, said dictionary being composed of names of places, roads, structures, gasoline service stations, convenience stores, and family restaurants, which exist in any or designated area of said plurality of areas, and the number of words of each area being limited to a certain number in accordance with said scale of the area.

5. A speech recognition system comprising:

a first storage section for storing a plurality of dictionaries each of which including a dictionary in which any number or designated number of words or sentences to be made an object of speech recognition are prepared and defined corresponding to a specific one of a plurality of areas;

a second storage section for storing a dictionary selected from said plurality of dictionaries, a dictionary change-over section for making a change-over between said plurality of dictionaries to select a dictionary from said plurality of dictionaries, in response to reception of dictionary change-over information based on position information generated from a Global Positioning System for vehicle navigation;

a speech analysis section for performing a speech analysis processing for an input speech; and a speech recognition section for performing a speech recognition processing for the result of speech analysis by said speech analysis section from the dictionary selected by said dictionary change-over section and stored in said second storage section and an acoustic model;

wherein, when any number or designated number of words or sentences made an object of speech recognition are prepared and defined as a dictionary, said dictionary is formed by names of places, roads, structures, gasoline service stations, convenience stores, family restaurants and so forth which exist in any or designated area of said plurality of areas, said dictionary being prepared for each area of said plurality of areas, and related with said acoustic model corresponding to speech recognition for an unspecified speaker.

6. A speech recognition system comprising:

a first storage section including a memory card and/or a read-only-memory (ROM) for storing a plurality of dictionaries each of which including a dictionary in which any number or designated number of words or sentences to be made an object of speech recognition are prepared and defined corresponding to a specific one of a plurality of areas;

a second storage section including a random-access-memory (RAM) for storing a dictionary selected from said plurality of dictionaries;

a dictionary change-over section for making a change-over between said plurality of dictionaries to select a dictionary from said plurality of dictionaries, in response to reception of dictionary change-over information based on position information generated from a Global Positioning System for vehicle navigation;

a speech analysis section for performing a speech analysis processing for an input speech; and a speech recognition section for performing a speech recognition processing for the result of speech analysis by said speech analysis section from the dictionary selected by said dictionary change-over section and stored in said random-access-memory (RAM) of said second storage section and an acoustic model;

wherein, when any number or designated number of words or sentences made an object of speech recognition are prepared and defined as a dictionary, said dictionary is formed by the names of places, roads, structures, gasoline service stations, convenience stores, family restaurants and so forth which exist in any or designated area of said plurality of areas, said dictionary being prepared for each area of said plurality of areas, and related with said acoustic model corresponding to speech recognition for an unspecified speaker.

7. A speech recognition system comprising:

a first storage section for storing a plurality of dictionaries each of which including a dictionary in which any number or designated number of words or sentences to be made an object of speech recognition are prepared and defined corresponding to a specific one of a plurality of areas, a second storage section for storing a dictionary selected from said plurality of dictionaries;

a dictionary change-over section for making a change-over between said plurality of dictionaries to select a dictionary from said plurality of dictionaries, in response to reception of dictionary change-over information based on position information generated from a Global Positioning System for vehicle navigation, said dictionary change-over information containing said position information from said Global Positioning System for use in said vehicle for vehicle navigation;

a speech analysis section for performing a speech analysis processing for an input speech; and a speech recognition section for performing a speech recognition processing for the result of speech analysis by said speech analysis section from the dictionary selected by said dictionary change-over section and stored in said second storage section and an acoustic model;

wherein, when any number or designated number of words or sentences to be made an object of speech recognition are prepared and defined as a dictionary, said dictionary is formed by the names of places, roads, structures, gasoline service stations, convenience stores, family restaurants and so forth which exist in any or designated area of said plurality of areas, said dictionary being prepared for each area of said plurality of areas, and related with said acoustic model corresponding to speech recognition for an unspecified speaker.

8. A speech recognition system for a vehicle, comprising:

a first storage section for storing a plurality of dictionaries each of which including a dictionary in which any number or designated number of words or sentences to be made an object of speech recognition are prepared and defined corresponding to a specific one of a plurality of areas of a map;

a second storage section for storing a dictionary selected from said plurality of dictionaries;

a dictionary change-over section for making a change-over between said plurality of dictionaries to select a dictionary from said plurality of dictionaries, in response to reception of the result of said speech recognition or dictionary change-over information based on position information generated from a Global Positioning System used in a vehicle navigation system;

a speech analysis section for performing a speech analysis processing for an input speech;

a speech recognition section for performing a speech recognition processing for the result of speech analysis from the dictionary selected by said dictionary change-over section and stored in said second storage section and an acoustic model; and a display section for providing a visual display of said dictionary change-over information to inform a user of the location of said vehicle relative to a particular area on the map and the number of words used for said speech recognition is limited to a predetermined number in accordance with a scale of the map displayed on said display section.

9. A speech recognition system according to claim 8, wherein, when any number or designated number of words or sentences made an object of speech recognition are prepared and defined as a dictionary, said dictionary is formed by the names of places, roads, structures, gasoline service stations, convenience stores, family restaurants and so forth which exist in any or designated area of said plurality of areas, said dictionary being prepared for each area of said plurality of areas to perform speech recognition, and in case where the result of speech recognition a corresponding word does not exist in a dictionary, said speech recognition is performed with a change made to the next dictionary which is made the object of speech recognition.

10. A speech recognition system according to claim 8, wherein, when any number or designated number of words or sentences to be made an object of speech recognition are prepared and defined as a dictionary, said dictionary is formed by the names of places, roads, structures, gasoline service stations, convenience stores, family restaurants and so forth which exist in any or designated area of said plurality of areas, said dictionary being prepared for each area of said plurality of areas to perform speech recognition, and in case where the result of speech recognition indicates an index of a dictionary, said speech recognition is performed with a change made to a dictionary as an object of speech recognition which is indicated by the index.

11. A speech recognition system according to claim 8, wherein said dictionary is structured by picking up according to priority among words existed in a corresponding area of said plurality of areas in accordance with scale of the area, said dictionary being composed of names of places, roads, structures, gasoline service stations, convenience stores, and family restaurants, which exist in any or designated area of said plurality of areas, and the number of words of each area being limited to a certain number in accordance with said scale of the area.

12. A speech recognition system according to claim 8, wherein said dictionary is composed of names of places, roads, structures, gasoline service stations, convenience stores, and family restaurants which exist in any or designated area of said plurality of areas, and the number of words of each area being limited to a certain number.

13. A speech recognition system for vehicle navigation using a Global Positioning System, comprising:

a first storage unit which stores a plurality of dictionaries, each dictionary indicating a list of directory information of a particular area on a map, including names of roads, places, structures and streets, street numbers, names of intersections, gasoline service stations, convenience stores, and/or family restaurants;

a second storage unit which stores a dictionary selected from said plurality of dictionaries for speech recognition;

a dictionary change-over unit which makes a change-over between different dictionaries stored in said first storage unit for selecting a dictionary from said plurality of dictionaries for speech recognition, in response to input of dictionary change-over information generated from said Global Positioning System for said vehicle navigation;

a speech analysis unit which performs a speech analysis of an input speech from a user requesting said vehicle navigation;

a speech recognition unit which performs a speech recognition after said speech analysis based on said dictionary selected from said plurality of dictionaries by said dictionary change-over unit and stored in said second storage unit and an acoustic model for said vehicle navigation; and a display unit for providing a visual display of said dictionary change-over information to inform a user of the location of said vehicle relative to said particular area on the map and the number of words used for said speech recognition is limited to a predetermined number in accordance with a scale of the map displayed on said display unit.

14. A speech recognition system according to claim 13, wherein said first storage unit contains a memory card and/or a read-only-memory (ROM), and said second storage unit contains a random-access-memory (RAM).

15. A speech recognition system according to claim 13, wherein said dictionary change-over information contains location information of said vehicle relative to a particular area on the map.

16. A speech recognition system according to claim 15, further comprising a display unit for providing a visual display of said dictionary change-over information to inform a user of the location of said vehicle relative to said particular on the map.

17. A speech recognition system according to claim 13, wherein said dictionary change-over information is periodically updated by said Global Positioning System for tracking the location of said vehicle along the map.

18. A speech recognition system according to claim 13, wherein said first storage unit further stores an address book dictionary which includes names, address, and phone numbers of registered persons.

19. A speech recognition system according to claim 18, wherein said speech recognition unit accesses said address book dictionary stored in said first storage unit to recall information of a designated name for vehicle navigation.

20. A speech recognition system according to claim 19, wherein said dictionary selected is composed of names of places, roads, structures, gasoline service stations, convenience stores, and family restaurants which exist in said particular area on the map.

21. A speech recognition system, comprising:

a storage unit which stores a plurality of dictionaries, each dictionary containing a collection of words or sentences prepared for speech recognition for providing information of a specific area on a map;

a speech analysis unit which analyzes an input speech from a user;

a speech recognition unit which recognizes said input speech based on speech analysis and an acoustic model for allowing access to information of a specific area on the map contained in a selected dictionary;

a dictionary change-over unit which makes a change-over between different dictionaries for said selected dictionary in response to input of dictionary change-over information; and display unit for providing a visual display of said dictionary change-over information to inform location of a user relative to said specific area on the map, and the collection of words or sentences used for said speech recognition is limited to a predetermined number in accordance with a scale of the map displayed on the display unit.

22. A speech recognition system according to claim 21, wherein said storage unit contains a read-only-memory (ROM) for storing said plurality of dictionaries, and a random-access-memory (RAM) for storing said selected dictionary.

23. A speech recognition system according to claim 21, wherein said dictionary change-over information contains location information of a vehicle relative to said specific area on the map, when said speech recognition system is incorporated into a vehicle navigation system using a Global Positioning System.

24. A speech recognition system according to claim 23, wherein said dictionary change-over information is periodically updated by said Global Positioning System for tracking the location of said vehicle along the map.

25. A speech recognition system according to claim 21, wherein said selected dictionary is composed of names of places, roads, structures, gasoline service stations, convenience stores, and family restaurants which exist in said specific area on the map.

26. A speech recognition system according to claim 21, wherein said storage unit further stores an address book dictionary which includes names, address, and phone numbers of registered persons, and wherein said speech recognition unit accesses said address book dictionary stored in said storage unit to recall information of a designated name for vehicle navigation.

* * * * *